United States Patent [19]
Payne

[11] 3,910,416
[45] Oct. 7, 1975

[54] FRUIT PIT DETECTING METHOD AND APPARATUS

[75] Inventor: George Calvin Payne, Sweet Home, Oreg.

[73] Assignee: Willamette Cherry Growers, Inc., Salem, Oreg.

[22] Filed: Mar. 12, 1974

[21] Appl. No.: 450,345

[52] U.S. Cl............. 209/74 M; 209/75; 209/111.7; 209/111.9; 99/490
[51] Int. Cl.²........................................ B07C 5/342
[58] Field of Search.... 209/73, 74, 74 M, 75, 111.9, 209/111.7, 111.6; 99/490

[56] References Cited
UNITED STATES PATENTS

| | | | |
|---|---|---|---|
| 2,635,746 | 4/1953 | Gordon............................ | 209/111.9 |
| 3,275,136 | 9/1966 | Allen et al................... | 209/111.7 X |
| 3,380,586 | 4/1968 | Frobese et al................... | 209/74 R |
| 3,489,277 | 1/1970 | Silverman......................... | 209/74 R |
| 3,773,172 | 11/1973 | McClure et al...................... | 209/74 |

*Primary Examiner*—Allen N. Knowles
*Attorney, Agent, or Firm*—Klarquist, Sparkman, Campbell, Leigh, Hall & Whinston

[57] ABSTRACT

An apparatus for inspecting fruit, such as cherries, which has passed through a pitting machine is disclosed. The apparatus includes transducers for detecting whether a pit has been successfully removed from each of a plurality of simultaneously pitted cherries, and if not, causes the operation of air cylinders to reject the unpitted cherries. Timing is accomplished with photocells and shift registers. Through the use of integrated circuitry a separate circuit for each piece of fruit simultaneously pitted is provided. The inspector is adaptable for most high-speed pitting machines presently known.

16 Claims, 6 Drawing Figures

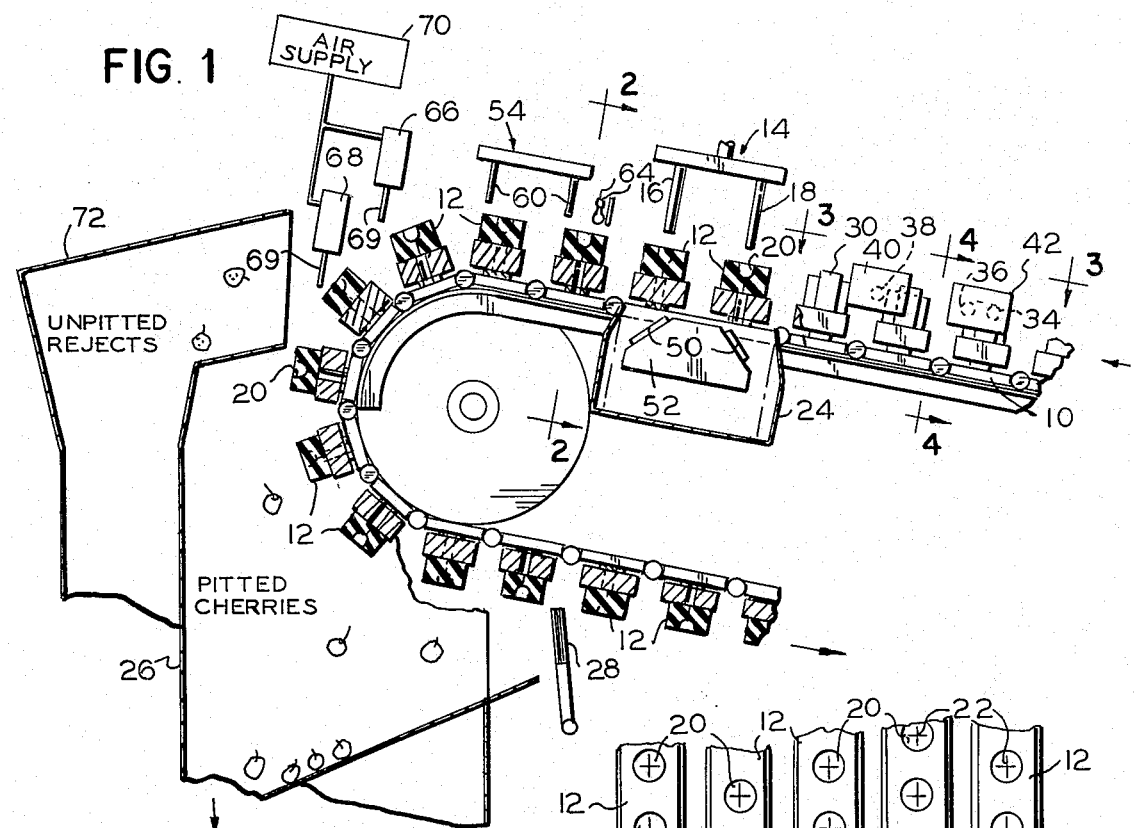
FIG. 1
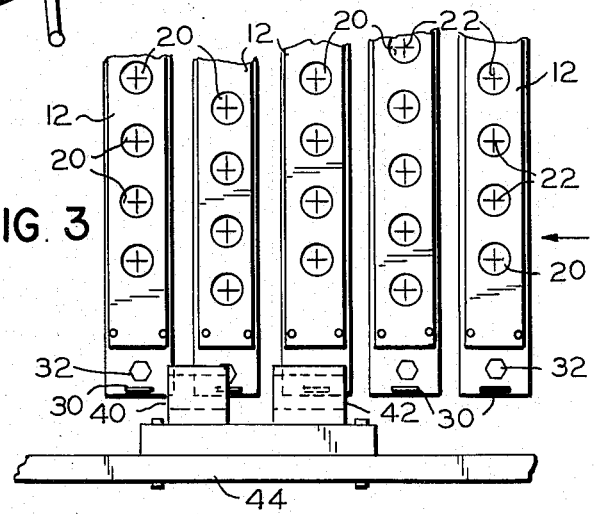
FIG. 4
FIG. 3
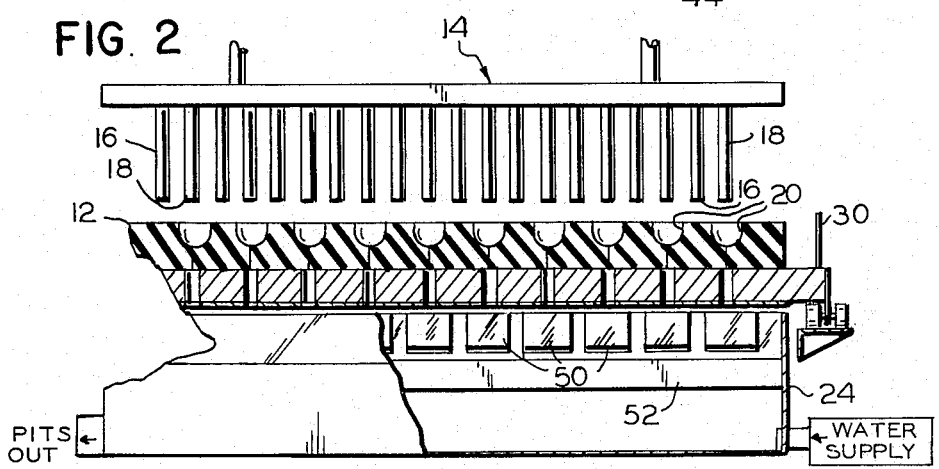
FIG. 2

FRUIT PIT DETECTING METHOD AND APPARATUS

BACKGROUND OF THE INVENTION

The present invention relates to inspection apparatus for fruit-pitting machines and more particularly to a system for determining whether or not a pit has been removed from a fruit operated on by a pitting tool. Further, the invention relates to a system of separating defectively pitted fruit from successfully pitted fruit. In the food-processing industry, it has been found desirable to remove stems and pits from fruit before further processing or canning of the fruit. For this purpose machines for pitting fruit have been developed and are presently well known in the art. For example, one high-speed fruit pitter which is well adapted to cherries is the Ashlock pitter. Another example of a high volume pitting machine for cherries is the Dunkley pitter. Both of these machines simultaneously remove pits from 20 to 54 cherries in a single cycle of operation.

These high-speed machines, although well designed, have a small but undesirable failure rate. That is, the pitting heads of these devices occasionally fail to remove a pit or remove only a portion of the pit. An unpitted piece of fruit among fruit that is believed to be completely pitted can have serious ramifications as, for example, where the fruit is canned and sold directly to the public. Accordingly, it has been the practice in the industry to provide inspectors for detecting and ejecting pieces of fruit which have not been properly pitted. Most of these inspecting devices are mechanical and process fruit one piece at a time. Examples are the patents to Carroll, such as U.S. Pat. Nos. 2,232,207 and 2,298,613. A pit inspector which employs electronic circuitry but is also of limited capacity is described in the U.S. patent to Harnworth et al, No. 2,547,207, wherein a single cherry is pitted and inspected before another cherry is received.

OBJECTS OF THE INVENTION

It is an object of the present invention to provide an apparatus for inspecting pitted fruit which employs high-speed electronic circuitry.

It is a further object to provide a pitting inspector which can be adapted to a conventional pitting machine.

It is another object of the present invention to provide an inspecting apparatus which can inspect a large volume of fruit simultaneously and separate defectively pitted fruit, Other objects and advantages will become apparent in the concluding portion of this specification.

SUMMARY OF THE INVENTION

The pit-inspecting apparatus of the present invention is fitted to an existing pitting machine such as an Ashlock pitter. The inspecting apparatus includes detecting means which generate signals in response to detecting pits successfully removed from the fruit. The signals are provided as inputs to each of a plurality of circuit means. A separate circuit means is provided for each piece of fruit simultaneously pitted. The signal indicating that a particular piece of fruit has been pitted is stored until the fruit reaches an ejection point. The stored signal is then used to prevent operation of a rejection means which separates out those pieces of fruit for which no signal is received. A timing means, responsive to the progress of the conveyor system, shifts successive sets of the pit signals through the circuit means storage elements.

An additional feature of the invention is the provision of means for rendering inoperative rejection means corresponding to receptacles on the conveyor which do not contain any fruit. This prevents excessive operation of the rejection means.

BRIEF DESCRIPTION OF THE DRAWINGS

FIG. 1 is a partial side view of the present invention installed on an Ashlock pitter;

FIG. 2 is a sectional view along the lines 2—2 of FIG. 1 showing the pitting structures;

FIG. 3 is a top view taken along the lines 3—3 of FIG. 1;

FIG. 4 is a sectional view taken along the lines 4—4 of FIG. 1 showing a photocell and timing pin;

DETAILED DESCRIPTION

Figure 5:
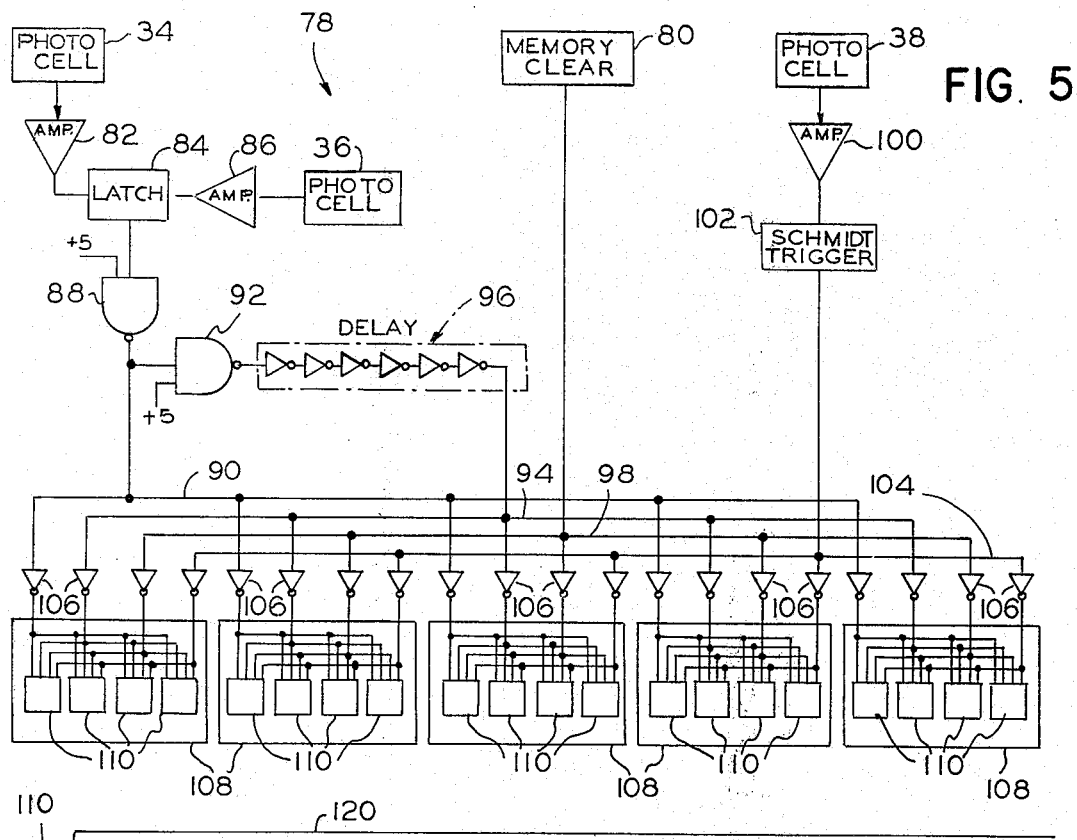
FIG. 5 is a schematic diagram of the control circuit for the present invention.

Referring to FIG. 1, a portion of an Ashlock pitting machine is shown with the present invention installed thereon. The Ashlock pitter includes a conveyor belt 10 on which are mounted rubber cup bars 12. The conveyor is driven by a motor (not shown) such that the rubber cup bars attached to it are passed under a pitting assembly 14 including two rows of pitting heads 16 and 18. As best seen in FIG. 3, the rubber cup bars 12 are rectangular in shape and can receive up to ten cherries in circular cups or depressions 20. These circular depressions or cups have slits 22 in the middle portion thereof for passing a cherry pit therethrough when a pitting head strikes the cherry. After passing through the slits 22, the pits pass downwardly into a trough 24 where they are eventually removed by a water flush.

The pitted cherries remain in the rubber cup bars 12 until the conveyor system dumps the cherries into a bin 26. Any cherries which do not drop off are pulled from the cherry receptacles by a brush 28 positioned adjacent the bin. As thus far described, it will be understood that a conventional Ashlock pitter loads unpitted cherries, by means not shown nor necessary to an understanding of the present invention, into the rubber cup bars 12 with a maximum of ten cherries to a bar. The rubber cup bars then pass under the pitting heads 16, 18 where two entire rows of cherries are pitted simultaneously, one row by each of heads 16 and 18. The pitted cherries are then dumped by force of gravity into the bin 26 for further processing.

Attached to each cup bar 12 is a timing pin 30 (FIGS. 3 and 4) which is a thin sheet of rectangular metal or other suitable material. Its function is to interrupt photocells positioned along the conveyor path. The timing pins 30 are anchored to the cup bars by bolts 32. Three photocells 34, 36 and 38 are mounted on brackets 40 and 42 bolted to the Ashlock frame 44. Each photocell comprises a light source 46 and a photoelectric detector 48 upon which the light source is focused. As the cup bars 12 move along the conveyor, the timing pins 30 will sequentially interrupt each of the photocells 34, 36 and 38. The outputs of the photocells provide timing information as will be described.

Referring to FIGS. 1 and 2, located in the trough 24 are a plurality of electromechanical transducers 50 mounted to a support assembly 52. For the Ashlock pitter, 20 such transducers are provided, one for each cherry in the two cup bars that are pitted simultaneously. The transducers are positioned directly under the pitting heads 16 and 18. By way of example, when two full cup bars are pitted simultaneously, 20 pits will be pushed down through the slits 22 in the cups 20, and each pit will impinge upon a transducer 50 located thereunder. The force of a pit striking a transducer will produce an electrical signal. After striking the transducers, the pits pass downwardly into the trough where they are washed out by water. The transducers may be of any known construction and, for example, a transistor radio earphone-type transducer will suffice.

For reasons to be explained, when one or more of the cups 20 in a cup bar 12 contains no cherry, it is desirable to detect this information. For this purpose the Ashlock pitter is fitted with one empty cup detecting means indicated generally at 54. The detecting means 54 is for rendering inoperative the rejection means and comprises a head containing two rows of ten photo detectors 60 having tubes fitted thereon to restrict the passage of light upwardly to the photo detectors. A light source 64 is positioned adjacent the means 54 at the approximate level of the cup bars 12. As the cup bars pass under these photo detectors, if a cherry is present in a cup, light will be reflected off the cherry, pass upwardly through the tubes and strike a corresponding photo detector 60. Conversely, if there is no cherry in a cup, the intensity of any reflected light will be significantly less. By appropriately setting the threshold of the 20 photo detectors 60, the presence or absence of a cherry in each cup can be distinguished.

Two rows of ten separation or rejection means comprising solenoid-actuated air cylinders 66 and 68 are positioned adjacent the end of the conveyor system, supported above the cherry cups. They are connected to an air supply 70 generated by a compressor (not shown). When actuated, each air cylinder will pass a high velocity jet of air downwardly. The cylinder nozzles 69 are preset to direct this air jet just above each cup 20 when the cup bars 12 are positioned thereunder. Each air jet will create a low pressure area above one cup 20 creating a pressure differential sufficient to pull a cherry out of the cup and deposit it in a reject bin 72. Cherries which are not removed from their cups (those which have been successfully pitted) fall into bin 26.

MECHANICAL OPERATION

Considering the operation of an Ashlock pitter, as modified according to the present invention, it will be understood that cherries are loaded into the cups or depressions 20 at one end of the conveyor system. They are then carried in the cup bars 12 to the pitting heads 16 or 18. The pitting heads pit two rows of cherries simultaneously and the pits are forced down through the slits 22 onto transducers 50 located under each cup 20 in the trough 24. Prior to reaching the pitting assembly 14 the timing pins 30 mounted on each cup bar 12 sequentially interrupt the light beams of photocells 34, 36 and 38. These photocell interruptions are employed for gating the empty cup means 54 and the air cylinders 66 and 68. Interrupting the beams of photocells 34 allows the air cylinders 66 and 68 to be turned on, if any unpitted cherries have been detected. Breaking the beams of photocells 36 turns all of the air cylinders off. Photocells 38 gate the empty cup means 54.

After the pitting operation, the rubber cups pass under the empty cup photo detectors 60 to determine those cups in the cup bars which are empty. Empty cups are seen by the transducers as unpitted cherries since no pit impinges thereon. If a cup does not contain a cherry, the corresponding air cylinder is disabled from firing since there is no cherry to separate out. Finally the cup bars pass under the air cylinders 66 and 68 and those cherries to be separated are fired upon and go into the reject bin 72 while the balance drop into bin 26.

CONTROL CIRCUIT

Referring now to FIG. 5, a schematic diagram of the control circuit 78 is shown, including four inputs to the circuit, namely inputs from photocells 34, 36 and 38 and a memory clear 80. The memory clear 80 is used at start-up to avoid unnecessary firing of the air cylinder and produces a pulse on line 98 which clears the memory elements shown in FIG. 6. Photocell 34 is coupled through an amplifier 82 to a latch 84. Similarly, photocell 36 is coupled through amplifier 86 to the latch 84. Interrupting the beam of photocell 34 causes the latch 84 to go high while interrupting the beam of photocell 36 resets the latch to its low state. The output of the latch 84 is provided as an input to NAND gate 88 while the other input is tied to +5 volts. The output of NAND gate 88 is connected to line 90 and also to the input of NAND gate 92. The other input of NAND gate 92 is tied to +5 volts. The output of NAND gate 92 is connected to line 94 via a series of six inverting amplifiers 96 which provide approximately at 40 nanosecond delay. Photocell 38 is connected via amplifier 100 and Schmidt trigger 102 to line 104.

The four lines 90, 94, 98 and 104 are connected via isolating amplifiers 106 to each of five circuit boards 108. Boards 108 contain four complete memory circuits 110 each receiving the inputs from lines 90, 94, 98 and 104. In view of the large number of discrete components that would be required, it will be apparent that the circuits are preferably implemented as integrated circuits. A memory circuit 110 is provided for each cup or depression 20 of the two cup bars 12 which are simultaneously pitted. Further it will be apparent that depending on the pitting machine involved, more or less boards 108 containing circuits 110 may be employed. For example, the Dunkley pitter requires 14 boards to process 54 cherries simultaneously.

Figure 6:
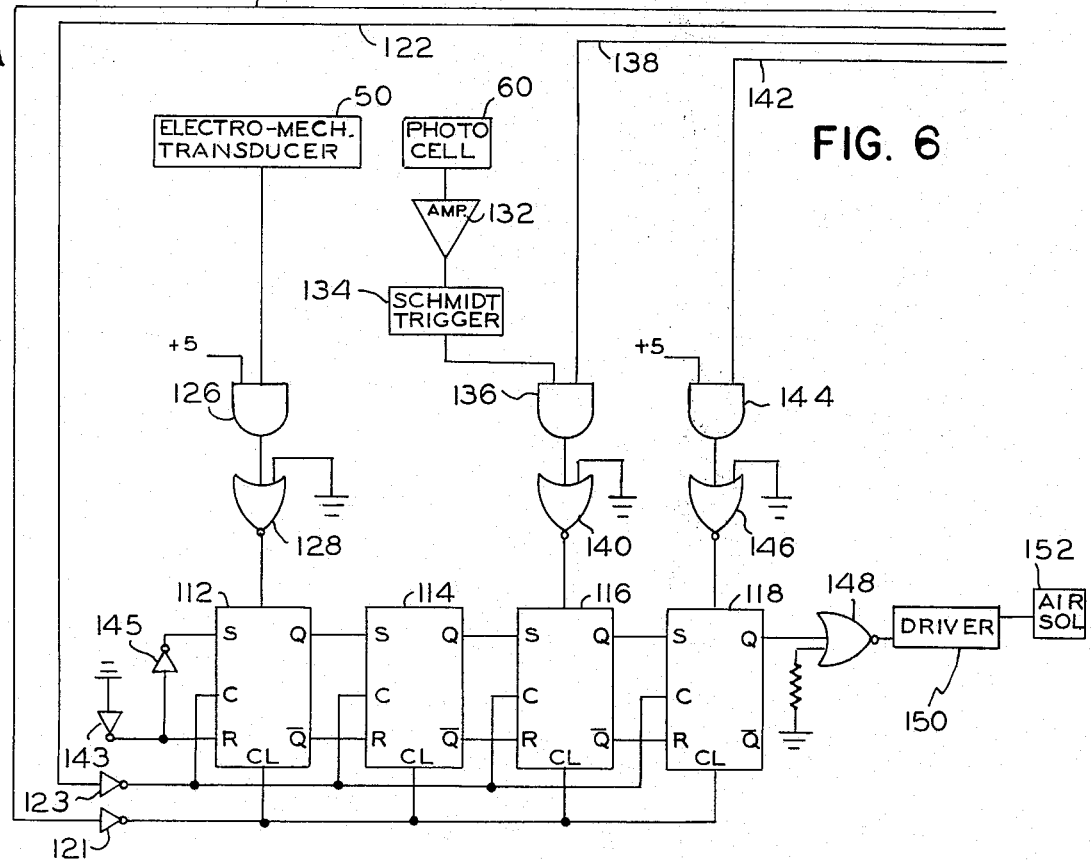
FIG. 6 is a schematic diagram of one of the memory circuits employed in the FIG. 5 circuit.

Referring now to FIG. 6, there is shown a schematic diagram of the memory circuit 110 according to the present invention. The circuit includes four R-S type flip-flops 112, 114, 116 and 118 which are connected as memory storage elements in a shift register. A greater or lesser number of flip-flops can be employed to effect a desired storage interval. Further, other well known logic devices could be employed as the memory storage and shift registers without departing from the scope of the invention. Line 98 of FIG. 5 is connected through an inverting amplifier 106 to line 120 of FIG. 6. Line 120 is applied via inverting amplifier 121 to the CL (clear) input of each flip-flop. Similarly line 122 receives an output from line 94 and applies it to the C (clock) input of the flip-flops via amplifier 123. This input provides gating signals for shifting information from one flip-flop to the next. Referring to FIG. 5, it will be seen that the clock signal is provided from NAND gate 92 via the delay 96.

An electromechanical transducer 50 is connected via AND gate 126 and NOR gate 128 to the flip-flop 112. A photodetector 60 from the empty cup detector means 54 is connected via amplifier 132 and a Schmidt trigger 134 to AND gate 136. The other input of AND gate 136 is provided from photocell 38 (FIG. 5) via line 104, amplifier 106 and line 138. The output of AND gate 136 is fed via NOR gate 140 into flip-flop 116. Line 142 receives its input from NAND gate 88 via line 90. This input is applied to the flip-flop 118 via AND gate 144 and NOR gate 146.

The Q and $\overline{Q}$ outputs of flip-flop 112, 114 and 116 are connected to the S (set) and R (reset) inputs of flip-flops 114, 116 and 118, respectively. Flip-flop 112 has its R input connected to the output of an inverting amplifier 143, the input of which is grounded. The S input of flip-flop 112 is connected to the output of inverting amplifier 145 whose input is connected to the R input. This arrangement provides an automatic reset for flip-flop 112 after each clock signal is received.

Connected to the Q output of flip-flop 118 is NOR gate 148 having a driver circuit 150 connected to its output. The driver circuit receives the Q output of flip-flop 118. If Q is high the driver is off. If Q is low the driver is energized and operates an air solenoid 152 to fire an air cylinder. It should be repeated that a separate circuit 110, as shown in FIG. 6, is provided for each cherry to be pitted simultaneously. That is, for an Ashlock pitter, 20 such circuits are provided. In a Dunkley pitter, which is capable of simultaneously pitting three rows of 18 cherries each, 54 such circuits would be provided. In this manner it is possible to adapt the present invention to almost any commercially developed fruit pitting device for cherries, prunes, peaches, etc.

CONTROL CIRCUIT OPERATION

Considering the operation of the circuitry disclosed in FIGS. 5 and 6, with reference to an Ashlock pitter, the memory clear circuit 80 is actuated each time the circuitry is initially turned on. The memory clear circuit 80 will provide a momentary positive pulse at the input of amplifier 121 which will cause all the flip-flops to go low, i.e., for producing a low output at each Q output terminal. Thus, the shift register flip-flops will have stored information of unpitted fruit. Let us assume cherries have been loaded into cup bars 12 and the conveyor system is moving whereby timing pins 30 successively interrupt the beams of photocells 34 and 36. The photocells 34 and 36 alternately trigger latch 84, and all the air solenoids 152 will fire until the stored information of unpitted fruit is shifted out of all four shift register flip-flops. The only exception will be the case when a cup is empty causing the output of flip-flop 116 to go high such that the air solenoid will not fire when this information reaches flip-flop 118. The above described memory clear action insures that unpitted fruit which is past the pitting head will be removed such that the possibility of unpitted fruit reaching bin 26 is eliminated.

When a pair of cup bars are directly under pitting assembly 14, the pitting heads 16 and 18 descend and force the pits out of the cherries. The pits pass down through the slits 22 onto the transducers 50 in the trough 24. Each cherry pit which strikes a transducer produces a signal provided to flip-flop 112 of a corresponding circuit 110. This causes flip-flop 112 to go into its high or set state.

Each time a timing pin 30 interrupts photocell 34, a clock signal is produced and received on line 122. The clock signal is supplied by way of amplifier 123 to all four flip-flops of the shift register simultaneously. The clocking action which results simply causes the inputs (designated S and R) of each flip-flop to be transferred to its outputs (designated Q and $\overline{Q}$). Immediately after a clock signal, flip-flop 112 is reset to its low state by means of the inverting amplifiers 143 and 145 connected to its inputs. By action of the clock signal the pit signal received from transducer 50, or absence thereof, is thus shifted from flip-flop 112 to flip-flop 114 via the S and R inputs of the latter. When the timing pin which produced the clock signal subsequently interrupts photocell 36, a signal for turning off the air cylinders is produced, as will be explained.

Each time the latch 84 is set by the photocell 34, a positive going (low to high) signal is applied to amplifier 123 which in turn results in the transfer-of-information sequence for each flip-flop. When photocell 36 resets latch 84, the signal applied at amplifier 123 goes low. However, the clocking action occurs only when the signal applied to amplifier 123 goes from a low voltage to a high voltage.

Subsequent interruption of photocell 34 produces additional clock signals effective to enter pit signals from a next pair of cup bars in the same manner as just described. Additionally, each previous pit signal is shifted from a flip-flop 114 to flip-flop 116 and from flip-flop 116 to flip-flop 118, in synchronism with movement of bars along the conveyor.

When a pit signal reaches flip-flop 116, the corresponding bar will be positioned under the empty cup detector 54 and a timing pin will break photocell 38's beam. This gates a signal from a photodetector 60 into flip-flop 116 by providing a signal on line 138 to AND gate 136. If there is a cherry in a particular cup, no signal is produced via amplifier 132 and Schmidt trigger 134. The AND gate 136 therefore remains low and the pit signal stored in flip-flop 116 remains unchanged.

Alternatively, in the event that a depression under test is empty, then AND gate 136 will go high causing a signal to be applied to flip-flop 116 via NOR gate 140. This signal will set the flip-flop thereby inverting the signal stored therein. This inversion is necessary because an empty cherry cup will be detected by a transducer 50 as an unpitted cherry. Unless the pit signal is inverted, i.e., changed from 0 to 1, it would cause a corresponding air cylinder to fire on an empty cherry cup. In this manner excessive firing of the air cylinders due to imperfect loading of cherries is avoided. The provision of a means for inhibiting the unnecessary firing of the air cylinders in a significant factor in the reliability and life of the air system and reduces the demand on air supply 70.

As subsequent timing pins interrupt photocell 34, the information stored in the flip-flops continues to be shifted so that when the lead bars reach the ejection point, beneath air cylinders 66 and 68, their pit signals will be in flip-flops 118 ready to actuate a driver circuit 150, if a cherry is present but the pit was not removed.

In addition to providing the clock signal, each time photocell 34 is interrupted an enable signal is provided to flip-flop 118 via lines 90 and 142, AND gate 144, and NOR gate 146. This signal is not delayed, as is the clock, and arrives at flip-flop 118, 40 nanoseconds prior to the clock signal. This signal enables the output of flip-flop 118. Then the clock signal arrives, the pit signal is transferred to the Q output of flip-flop 118. If the pit signal corresponds to an unpitted cherry, the Q output will be low. As described, a low Q output energizes the driver circuit 150 thereby activating the solenoid 152 and its corresponding air cylinder to eject a defectively pitted cherry. Conversely, if a pit signal represents an empty cup or a properly pitted cherry, the Q output will be high and not energize the driver circuit.

Shortly after the air cylinders have ejected any unpitted cherries, the timing pin that interrupted photocell 34 to actuate the air cylinders will reach and interrupt photocell 36. This resets latch 84 to its low state, changing the signal on lines 90 and 142 which disables flip-flops 118, thereby turning off the air cylinders.

It will be appreciated that plural sets of pit signals will be continuously received and shifted through the shift registers as additional cherry cup bars break beams of photocells. Thus the present invention is capable of continuously inspecting and rejecting defectively pitted cherries. As described, modification of the circuit can be easily accomplished for use with a Dunkley or similar pitter.

While the above-described embodiment is preferred, it is possible, with only minor modifications, to reverse the mode of operation of the inspecting circuit such that cherries successfully pitted will be blown into bin 72 while rejected cherries will not be acted upon and fall into bin 26. The advantage of such a modification is that it would not be necessary to employ empty cup detector 54 since an empty cup would not cause firing of the air cylinders. An empty cup would appear as a rejected cherry. This modification would result in simplifying the circuitry by eliminating photocells 38 and 60. To operate the invention in this manner the driver circuit 150 is modified to energize when the Q output of flip-flop 118 is high and turn off when it is low. The drawback of this modification is that normally only a small percentage of the cherries are defectively pitted. Thus, although electrically simpler, the air system would be firing almost constantly. The problem of providing an air supply which can effectively supply a large number of air cylinders with a constant pressure is not small. On the other hand, it is contemplated that means other than air cylinders may be used to separate pitted from unpitted fruit. In that event the above-described alternate circuit could be preferable.

While I have shown and described the preferred embodiment of the invention and suggested possible variations, it should be apparent to those skilled in the art that the invention permits of modification of operation and arrangement. I claim as my invention all modifications as come within the true spirit and scope of the following claims.

I claim:

1. An apparatus for inspecting fruit passing through a pitting machine on a conveyor having receptacles for said fruit comprising:
   a plurality of detection means for generating signals in response to detecting pits successfully removed from said fruit, said detection means comprising means responsive to passage of said pits after removal thereof from said fruit;
   a plurality of circuit means having at least first, intermediate and last storage elements for receiving and storing plural sets of said signals;
   timing means responsive to the progress of said receptacles for shifting successive sets of said signals from said first storage elements to subsequent storage elements;
   and a plurality of separating means each responsive to the presence or absence of a signal at said last storage element outputs for separating defectively pitted fruit from successfully pitted fruit.

2. Apparatus of claim 1 further including means for rendering inoperative ones of said separating means in the absence of fruit in a conveyor receptacle.

3. Apparatus of claim 1 including means responsive to said timing means for enabling the output of the last storage element outputs, said separating means being operative in accordance with the enablement of the output of the last storage element.

4. Apparatus of claim 1 wherein said detection means comprise electromechanical transducers which generate said signals when said pits impinge thereon.

5. Apparatus of claim 1 wherein said storage elements comprise shift registers.

6. Apparatus of claim 1 wherein said circuit means are implemented as integrated circuits.

7. Apparatus of claim 6 wherein the number of detecting means and circuit means are the same as the number of pieces of said fruit pitted in one cycle of operation of said pitting machine.

8. Apparatus of claim 6 wherein a separate detecting means and circuit means is provided for each receptacle passing under the pitting assembly in one cycle of operation of said machine.

9. Apparatus of claim 1 wherein said timing means include:
   timing pins mounted on said conveyor and photoelectric means positioned along said conveyor responsive to said timing pins.

10. Apparatus of claim 9 wherein said photoelectric means include:
    a first photocell responsive to said timing pins for enabling said last storage element outputs and for causing said shifting of said signals, and
    a second photocell responsive to said timing pins for disabling said last storage element outputs thereby to turn off said separating means.

11. Apparatus of claim 1 wherein said separating means includes a plurality of solenoid-actuated air cylinders supplied from a common compressed air supply.

12. Apparatus of claim 2 wherein said means for rendering inoperative includes:
    a light source positioned along said conveyor at the level of said receptacles;
    a plurality of photo detectors positioned above said receptacles for detecting light from said source reflected off fruit in said receptacles and providing an indication in the absence of fruit in said receptacle;
    a photocell responsive to the progress of said receptacles for providing said indication to an intermediate storage element only when said receptacles are directly under said photo detectors;
    said indication, if provided to said intermediate storage element, inverting the pit signal stored therein to thereby prevent operation of said separating means.

13. An apparatus for inspecting fruit passing through a pitting machine on a conveyor having receptacles for said fruit comprising:
    a plurality of electromechanical transducers generating signals in response to pits successively removed from said fruit impinging thereon;
    a plurality of circuits having at least first, intermediate and last storage means for storing and shifting plural sets of said signals;
    timing pins mounted on said conveyor;
    a first photocell positioned along said conveyor responsive to said timing pins for enabling last storage means outputs and for causing shifting of said signals;
    a second photocell positioned along said conveyor responsive to said timing pins for disabling the last storage means outputs;
    and a plurality of solenoid-actuated air cylinders each responsive to the presence or absence of a signal at one of said last storage means outputs, when said last storage means outputs are enabled for separating unpitted fruit from successfully pitted fruit.

14. The apparatus of claim 13 further including a light source positioned along said conveyor at the level of said receptacles;
    a plurality of photo detectors positioned above said receptacles for detecting light from said source reflected off fruit in said receptacles and providing an indication in the absence of fruit in said receptacle;
    and a photocell responsive to the progress of said receptacles for providing said indication to an intermediate storage element only when said receptacles are directly under said photo detectors;
    said indication, if provided to said intermediate storage element, inverting the pit signal stored therein to thereby prevent operation of the separating means.

15. A method for inspecting fruit passing through a pitting machine on a conveyor having receptacles for said fruit comprising the steps of:
    detecting pits separately from said fruit after said pits have been successively removed from said fruit;
    generating a set of signals in response to detecting said pits;
    providing each of said signals to a separate memory storage circuit;
    shifting successive sets of said signals through said memory storage circuits in response to the progress of said receptacles on said conveyor;
    and separating fruit contained in said receptacles according to the presence or absence of a signal at the outputs of said memory storage circuits.

16. The method of claim 15 further including detecting receptacles which are empty and altering the signal stored in the memory circuits in the absence of fruit in a receptacle by inverting the signal stored in said memory circuits which correspond to said empty receptacles.

* * * * *